US008774164B2

(12) United States Patent
Klein et al.

(10) Patent No.: US 8,774,164 B2
(45) Date of Patent: Jul. 8, 2014

(54) ADAPTIVE R99 AND HS PS (HIGH SPEED PACKET-SWITCHED) LINK DIVERSITY FOR COVERAGE AND CAPACITY ENHANCEMENT OF CIRCUIT-SWITCHED CALLS

(75) Inventors: Robert Klein, Manchester, CT (US); Arthur Brisebois, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 982 days.

(21) Appl. No.: 12/392,578

(22) Filed: Feb. 25, 2009

(65) Prior Publication Data

US 2010/0215034 A1  Aug. 26, 2010

(51) Int. Cl.
*H04W 36/06* (2009.01)
*H04L 12/66* (2006.01)

(52) U.S. Cl.
USPC ............ 370/352; 370/338; 370/389; 455/552

(58) Field of Classification Search
USPC .......................... 370/329, 352, 353; 455/436, 455/435.2–438, 522
See application file for complete search history.

(56) References Cited

U.S. PATENT DOCUMENTS

| | | | | |
|---|---|---|---|---|
| 6,954,612 | B2 * | 10/2005 | Cheng et al. ................. | 455/11.1 |
| 7,957,716 | B2 * | 6/2011 | Ganger et al. ............... | 455/323 |
| 8,041,325 | B2 * | 10/2011 | Jonsson et al. .............. | 455/296 |
| 8,111,720 | B2 * | 2/2012 | Synnergren ................. | 370/517 |
| 8,159,980 | B2 * | 4/2012 | Jappila et al. ............... | 370/310 |
| 2004/0027997 | A1 * | 2/2004 | Terry et al. .................. | 370/276 |
| 2006/0268783 | A1 * | 11/2006 | Julian et al. ................. | 370/331 |
| 2007/0140123 | A1 * | 6/2007 | Fukui ......................... | 370/235 |
| 2008/0026752 | A1 * | 1/2008 | Flore et al. ................. | 455/435.2 |
| 2008/0037450 | A1 * | 2/2008 | Itoh et al. ................... | 370/278 |
| 2008/0090575 | A1 * | 4/2008 | Barak et al. ................. | 455/444 |
| 2008/0151743 | A1 * | 6/2008 | Tong et al. .................. | 370/204 |

(Continued)

FOREIGN PATENT DOCUMENTS

| | | |
|---|---|---|
| CA | 2656432 A1 | 1/2008 |
| WO | 2007092245 A2 | 8/2007 |

OTHER PUBLICATIONS

Derksen, Jan, et al., HSDPA Performance and Evolution, http://www.ericsson.com/ericsson/corpinfo/publications/review/2006_03/files/6_hsdpa.pdf, last accessed on Feb. 25, 2009, 4 pages.

(Continued)

*Primary Examiner* — Edan Orgad
*Assistant Examiner* — Emmanuel Maglo
(74) *Attorney, Agent, or Firm* — Amin, Turocy & Watson, LLP

(57) ABSTRACT

A system and methodology that facilitates adaptive link diversity for enhanced coverage and capacity during user data communication in a UMTS (Universal Mobile Telecommunications System) is provided. Specifically, current radio conditions associated with the user data are monitored and analyzed. Moreover, a switching and/or concurrent transport mechanism is implemented for communication between a NodeB and UE (User Equipment), when the current radio conditions change beyond a predefined level. In particular, a CS (Circuit Switched) over HSPA (High Speed Packet Access) connection is reconfigured to an R99 (Release 99) CS connection, or a concurrent R99 CS connection is provided along with the CS over HSPA connection, when detected that radio conditions have degraded beyond a predefined threshold. In one aspect, the selection between switching to a new transport mechanism and, adding a concurrent transport mechanism is based on an analysis and/or operator defined conditions.

23 Claims, 14 Drawing Sheets

(56) References Cited

U.S. PATENT DOCUMENTS

| | | | |
|---|---|---|---|
| 2009/0016328 A1* | 1/2009 | Peisa et al. | 370/352 |
| 2009/0154403 A1* | 6/2009 | Niwano | 370/329 |
| 2009/0175173 A1* | 7/2009 | Kim et al. | 370/241 |
| 2009/0225702 A1* | 9/2009 | Lai | 370/328 |
| 2009/0257407 A1* | 10/2009 | Park et al. | 370/336 |
| 2009/0300456 A1* | 12/2009 | Pelletier et al. | 714/749 |
| 2010/0222059 A1* | 9/2010 | Pani et al. | 455/436 |
| 2010/0260099 A1* | 10/2010 | Frost et al. | 370/328 |

OTHER PUBLICATIONS

Bergman, Joha N. et al., Continued HSPA Evolution of Mobile Broadband, http://www.ericsson.com/ericsson/corpinfo/publications/review/2009_01/files/HSPA.pdf, last accessed on Feb. 25, 2009, 5 pages.

International Search Report and Written Opinion, mailing date Jul. 20, 2010, for International Application No. PCT/US2010/023115, 14 pages.

* cited by examiner

CS over HSPA

R99 CS

R99 CS + CS over HSPA

ADAPTIVE R99 AND HS PS (HIGH SPEED PACKET-SWITCHED) LINK DIVERSITY FOR COVERAGE AND CAPACITY ENHANCEMENT OF CIRCUIT-SWITCHED CALLS

TECHNICAL FIELD

The subject innovation relates to wireless communications and, more particularly, to system and methods that switch to a new and/or concurrent transport mechanism that facilitates link diversity to improve coverage and capacity during CS (Circuit Switched) over HSPA (High Speed Packet Access) communications.

BACKGROUND

Mobile data communications is evolving quickly because of global communications network such as the Internet, intranets, laptops, PDAs (personal digital assistants) and increased requirements of workforce mobility. Third generation mobile system (3G) technologies (e.g., UMTS-Universal Mobile Telecommunications System) are considered enhancements to GSM (Global System for Mobile telecommunications) cellular standards.

New technologies are required to deliver high speed location and mobile terminal specific content to users. The emergence of new technologies thus provides an opportunity for a boom similar to what the computer industry had in 1980's, and that Internet and wireless voice had in 1990's. UMTS can be considered as the commercial convergence of fixed line telephony, mobile, Internet and computer technology. The UMTS transport network is preferred when handling demanding wireless data traffic.

To further extend and/or improve the performance of existing UMTS protocols a collection of mobile telephony protocols are utilized, such as HSPA (High Speed Packet Access). Typically, voice calls can be routed over HSPA based transport channels, such that, network air interface (Uu) and RNC (radio network controller) and/or NodeB transport efficiencies can be increased. Further, carrying CS traffic over HSPA can significantly save power and conserve battery life of the UE (user equipment).

As UMTS and other 3G technologies evolve towards facilitating voice (and video) over packet switched transport mechanisms, such as VoIP (Voice over Internet Protocol), various problems to carry voice traffic over a packet switched interface can be encountered. Carrying CS traffic over HSPA reduces priority in the IuB interface. Further, during CS over HSPA, effective coverage area can be reduced due to loss of SHO (soft handover) in the downlink.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

The systems and methods disclosed herein, in one aspect thereof, can improve capacity and coverage in a wireless communication system, such as, but not limited to UMTS (Universal Mobile Telecommunications System), when a CS (Circuit Switched) over HSPA (High Speed Packet Access) link is utilized for communication. In one embodiment, a system and method is provided that can convert and reconfigure a CS over HSPA connection to an R99 (Release 99) CS connection when degraded radio conditions are identified. In another embodiment, a system and method is provided that can maintain and utilize concurrent CS over HSPA and R99 CS connections for communication between a NodeB and UE (User Equipment) when degraded radio conditions are identified. Further, in yet another embodiment, a system and method is disclosed that can provide both the switching and concurrent transport mechanisms and can intelligently select between the two, such that, resources are optimally utilized.

According to an aspect of the system, a radio condition detection component can be employed to determine when radio conditions associated with user data degrade below a predefined threshold. Moreover, the radio condition detection component can monitor current radio conditions, events and/or UE characteristics (e.g. speed and/or distance of the UE) and analyze the monitored information. Further, a link conversion component can be employed to reconfigure transport mechanisms between the NodeB and UE based in part on the analysis information, such that, resources are efficiently utilized. For example, when radio conditions degrade beyond a predefined threshold, the link conversion component can convert a CS over HSPA voice call to an R99 CS voice call. Additionally or alternately, a link addition component can be employed to switch from a single CS over HSPA connection to concurrent CS over HSPA and R99 CS connections, based in part on the analysis information. Moreover, the link addition component can switch from a single CS over HSPA connection to concurrent CS over HSPA and R99 CS connections when radio conditions degrade beyond a disparate predefined threshold. The additional link increases redundancy and provides improved voice quality.

In accordance with another aspect of the system, a link selection component can be employed to determine whether a new radio bearer can be utilized, or, an additional radio bearer can be utilized, to transmit data between a NodeB and a UE. In particular, the link selection component performs the determination based on the analysis information received from the radio condition detection component that includes, but is not limited to, current radio conditions, event information, UE characteristics, etc. In one example, the link selection component can select an optimal transport mechanism to deliver user data based on an analysis of the received information, such that, resources are efficiently utilized and call quality and reliability is improved.

Yet another aspect of the disclosed subject matter relates to a method that enables an operator/service provider to reap gains of employing CS over HSPA, and, in addition improve the CS coverage footprint of the network. The method comprises identifying and analyzing current radio conditions associated with communication between a NodeB and a UE. Further, a CS over HSPA connection can be utilized for the communication, when identified that radio conditions have not degraded below a first threshold. In one example, the first and a second threshold can be predefined by an operator, such that the first threshold is higher than the second threshold. However, when the radio conditions lie between the first and second thresholds, an R99 CS connection can be employed for the communication. Accordingly, a CS over HSPA connection can be reconfigured to an R99 CS connection to achieve a greater coverage area and improve call reliability. Furthermore, an R99 CS connection can be concurrently employed with a CS over HSPA connection for the communication when the radio conditions degrade below the second predefined threshold, such that reliability is further improved.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
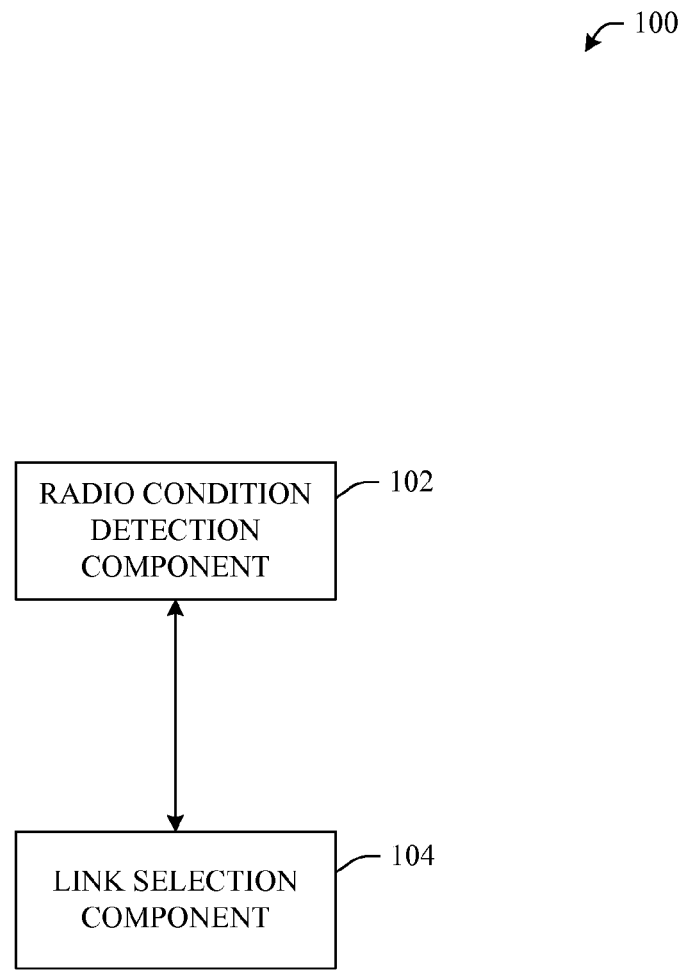
FIG. 1 illustrates a high-level system diagram depicting an example system that facilitates capacity and coverage enhancement in a wireless communication system, according to an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset,", and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the term "Node B," employed herein can additionally denote an "access point," "base station," "evolved Node B." "home Node B (HNB)," and the like, and refers to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber,", "operator", "customer," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Traditionally, voice calls on UMTS (Universal Mobile Telecommunications System) are served by utilizing R99 (Release 99) resources. Typically, R99 connections can allow a single voice call to be in soft handover (SHO) with up to three different cells and thus improve coverage area. However, R99 resources are dedicated to the call for its duration—regardless of gaps during communication. Additionally, a UE (User Equipment) remains active for the entire duration of the call, thus, decreasing battery life of the UE. Another approach employed on UMTS is voice calls over HSPA (High Speed Packet Access). Moreover, HSPA utilizes shared resources that can be allocated and re allocated, such that, resources are efficiently utilized when there are gaps in communication. However, HSPA does not provide SHO, so a given UE works with only a single cell at a time in the downlink. Hence, the amount of power required to support calls when the UE is nearer to the edge of the cell is higher as compared to a conventional R99 CS call.

Systems and/or methods are presented herein that provide link diversity to facilitate coverage and capacity enhancements in a wireless communication system, for example, UMTS. In one aspect, a switching and/or concurrent transport mechanism is employed that can convert a CS (circuit switched) over HS (High Speed) call to a conventional R99 CS call when radio conditions degrade beyond a preset threshold. Thus, the user plane can be switched for voice calls based on detected radio conditions, such that, resource utilization and call quality are optimized.

Referring initially to FIG. 1, there illustrated is a high-level system diagram depicting an example system 100 that facilitates capacity and coverage enhancement in a wireless communication system (e.g. UMTS), according to an aspect of the subject specification. The system 100 can be employed during audio communications and provides advantages associated with CS over HSPA, such as, improved Uu (air interface) and IuB interface efficiencies along with improved battery life for UEs, while overcoming the coverage limitations of CS over HSPA by converting to an R99 CS when necessary. It can be appreciated that although audio (voice) traffic is discussed herein, the subject system is not limited to audio traffic and can employ data, video or audio traffic and/or a combination thereof. According to one example, the system 100 can be implemented in the RNC (Radio Network Controller) and/or NodeB in a UMTS.

According to an aspect, system 100 can typically include a radio condition detection component 102 that can be employed to determine when radio conditions associated with a voice call degrade below one or more predefined threshold. The thresholds can be defined by an operator or automatically determined by employing a machine learning technique. Moreover, the radio condition detection component 102 can monitor current radio conditions and/or various other factors (e.g. speed and/or distance of the UE) that facilitate determination of an optimal transport mechanism. In one example, the radio condition detection component 102 can receive information associated with channel quality, BLER (Block Error Rate), and/or power associated with a voice call, from a UE. In another example, the condition detection component 102 can determine current radio conditions employing existing thresholds, such as, but not limited to, CPICH (Common Pilot Channel) RSCP (Received Signal Code Power) and/or Ec/Io (the ratio of received pilot energy, Ec, to total received energy or the total power spectral density, Io).

System 100 can further include a link selection component 104 that can select a new (or additional) transport mechanism for the voice call based on the conditions associated with the voice call. In one aspect, during CS over HSPA, when degraded radio conditions are detected (e.g. by the radio condition detection component 102), the link selection component 104 can convert the CS over HSPA call to an R99 CS call. Moreover, when radio conditions improve, the R99 CS call can be re-converted to a CS over HSPA call.

According to another aspect, the link selection component 104 can generate concurrent transport mechanisms, for example, a CS over HSPA connection along with an R99 CS connection to provide increased reliability for a voice call, when detected that radio conditions are degraded (e.g. by the radio condition detection component 102). Accordingly, call data can be sent to and/or received from the UE concurrently via two streams and can be aggregated (e.g. at the UE and at the NodeB) by employing various aggregation and/or aligning techniques. In addition, when detected that the radio conditions have improved, resources utilization can be optimized by switching back to a single CS over HSPA connection.

In yet another aspect, the link selection component 104 can receive information from the radio condition detection component 102 associated with an analysis of current radio conditions and/or one or more factors (e.g. speed, distance of UE from NodeB, etc.). The analysis can also include factors, such as but not limited to, QoS (Quality of Service), number of retransmissions, etc. Based in part on the received information, the link selection component 104 can determine optimum transport mechanisms for user data, such that, network resources are efficiently utilized. In particular, the link selection component 104 can select between converting the existing CS over HSPA connection to an R99 CS connection, and, adding a concurrent R99 CS connection to the existing CS over HSPA connection to provide a redundant stream of voice traffic, based on an analysis of the received information. Additionally, the conversion of transport mechanisms (e.g. by the link selection component 104) can be based on QoS of the user data. For example, QoS of the user data can be employed to determine if link diversity should or should not be used. Moreover, low bit rate and/or latency sensitive QoS can have a higher priority for link diversity, whereas high bit rate, latency insensitive and/or best-effort QoS can be better served by a single connection with retransmissions (time diversity) and thus be given lower priority. Further, the link selection component 104 can also be employed to identify a transport mechanism for primary transmissions and/or retransmissions. For example, rather than utilizing the same transport mechanism for primary transmissions and retransmissions, the link selection component 104 can specify the use of a CS over HSPA connection for primary transmission and an R99 CS (or concurrent R99 CS along with CS over HSPA) connection for retransmissions (or vice versa). Thus, the link selection component 104 can deliver link diversity gain while optimizing the utilization of CS over HSPA for efficiency and battery life savings.

Figure 2:
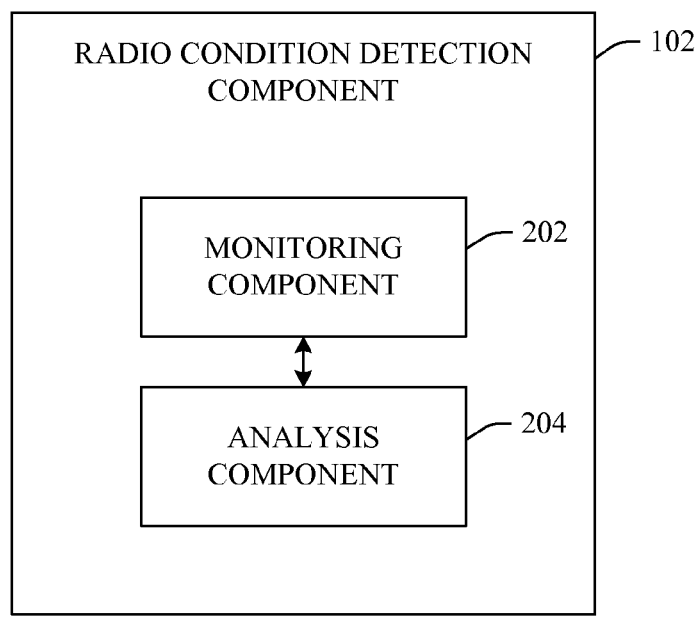
FIG. 2 illustrates an example system that can be employed for detection of current radio conditions in a wireless communication system, according to an aspect of the subject disclosure.

Referring now to FIG. 2, there illustrated is an example system 200 that can be employed for identification of current radio conditions in a wireless communication system, according to an aspect of the subject disclosure. The system 200 includes a radio condition detection component 102 that can include functionality, as more fully described herein, for example, with regard to system 100.

Typically, a monitoring component 202 can be included in the radio condition detection component 102, which can be employed to monitor and/or determine current radio conditions associated with user data communication. In one aspect, the monitoring component 202 can monitor one or more events and/or factors associated with a user data communication, such as, but not limited to BLER (Block Error Rate), CPICH (Common Pilot Channel) RSCP (Received Signal Code Power), Ec/Io (the ratio of received pilot energy, Ec, to total received energy or the total power spectral density, To), retransmission rate etc. Further, the monitoring component 202 can receive information associated with the communication of the user data, such as, but not limited to, transmission power, channel quality, etc.

According to an aspect, an analysis component 204 can aggregate the received and/or monitored information and determine a current radio condition. In one example, the analysis component 204 can compare the received and/or monitored information to one or more thresholds. It can be appreciated that the thresholds can be predefined, for example, by an operator, or can be automatically determined by employing machine learning techniques. For example, when a voice call is transmitted between a NodeB and a UE on a CS over HS connection, the analysis component 204 can check event 5A (BLER), 2d, HS TX power or UE TX power assigned to that connection. Furthermore, the analysis component 204 can compare the CPICH RSCP and/or Ec/Io with the respective threshold levels defined by the operator.

In addition, when a CS over HSPA connection is utilized, the analysis component 204 can compare an ACK/NACK (acknowledgment/negative acknowledgement) ratio to determine current radio conditions. Moreover, the number of repetitions, retransmissions and/or ratio of received vs. sent transmissions can facilitate determination of current radio conditions, by the analysis component 204. For example, when frames are retransmitting frames too often (e.g. based on comparison with a threshold), the analysis component 204 can determine that the radio conditions are currently degraded. Similarly, CQI (channel quality indicator) can also be used by the analysis component 204 for radio condition determination. Typically, CQI is sent by mobile device (UE) to the NodeB and facilitates determination of throughput that can be pumped into the mobile device and/or the amount of power required for transmission.

In accordance with an embodiment, the monitoring component 202 can also determine and/or monitor UE speed and distance of the UE from the NodeB. Typically, an R99 bearer is preferred for high speed UE that can utilize soft hand over (SHO) and a HSPA bearer is preferred for a slow moving or stationary UE. The current speed of the UE can be compared to a predefined threshold to determine whether the UE is moving at a high or slow speed. Accordingly, the analysis component 204 can take into account the UE speed and/or distance of the UE from the NodeB for current radio condition determination. In one example, the analysis component 204 can aggregate the information received from the monitoring component 202 and determine if the current conditions are "degraded" or "non-degraded". Accordingly, the analysis component 204 can send the detected radio condition to a link selection component (104 FIG. 1) when a change in current condition occurs (e.g. from "degraded" to "non-degraded" or vice versa).

Figure 3:
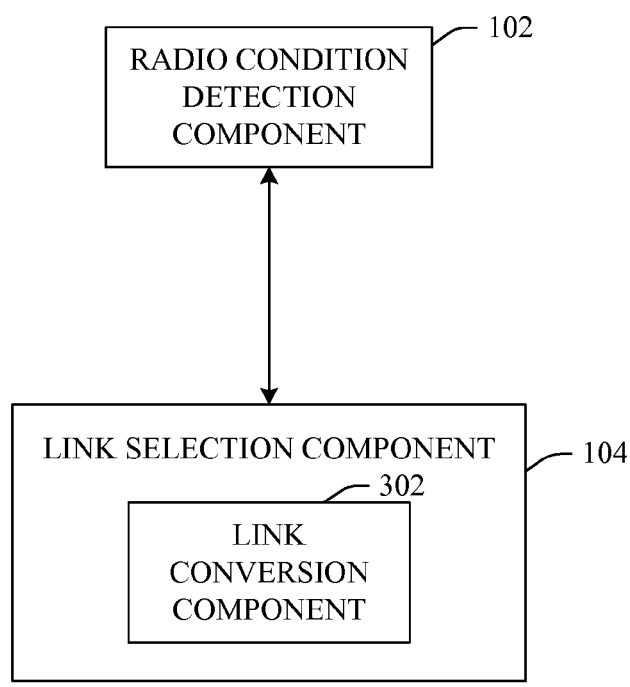
FIG. 3 illustrates example system that can be employed to improve effective coverage area for CS (Circuit Switched) over HSPA (High Speed Packet Access) traffic in accordance with an aspect of the subject innovation.

FIG. 3 illustrates an example system 300 that can be employed to improve effective coverage area for CS over HSPA traffic in accordance with an aspect of the subject innovation. System 300 can be easily implemented (e.g. in Node B or RNC) without any changes to the UE (or with minimal changes to the UE) and can significantly increase effective coverage area. Thus, the capital expenditure for implementing system 300 can be minimal. It can be appreciated that the radio detection component 102 and link selection component 104 can include functionality, as more fully described herein, for example, with regard to systems 100 and 200.

The radio detection component 102 can facilitate monitoring of radio conditions, events, UE characteristics (e.g. speed and/or distance from NodeB), etc. Further, the radio condition detection component 102 can analyze the monitored information to detect a change in current radio conditions, events, and/or UE characteristics. In one example, the radio detection component 102 can determine when radio conditions degrade below operator defined CPICH RSCP and/or Ec/Io thresholds. Moreover, it can be appreciated that most any existing or new thresholds can be set to monitor events and/or changes in radio conditions and/or UE characteristics. For example, existing thresholds, such as, but not limited to, 2d, 5A (BLER) and/or HS TX Pwr/UE TX Pwr can be utilized. Specifically, utilization of existing thresholds can be preferred since changes to the UE can be avoided. However, it can be appreciated that the subject specification is not limited to employing existing thresholds and most any new threshold and/or event can be created, for example, that can be reported by the UE.

According to an aspect, the link selection component 104 can receive information from the radio condition detection component 102 when current radio conditions change. In addition, the link selection component 104 can also receive indication of an event or change in ULE characteristics. Typically, the link selection component 104 can include a link conversion component 302 that can be employed to reconfigure transport mechanisms between the NodeB and UE, such that, resources are efficiently utilized. Specifically, the link conversion component 302 can convert a CS over HSPA voice call to an R99 CS voice call when determined that radio conditions have degraded. In addition, a CS over HSPA connection can be converted to an R99 CS connection by the link conversion component 302 when determined that the UE is moving at a high speed. Further, a switch from CS over HSPA to an R99 CS connection can occur when determined that the number of retransmissions has exceeded a predefined threshold. As an example, the R99 CS connection can be 12.2 kbps or 5.9 kbps, with the latter being preferred for the additional processing gain it can possess.

Based on the information received from the radio condition detection component 102, the link conversion component 302 can send the UE a radio bearer reconfiguration message that can include information associated with the new channel for communication. For example, the message can indicate that the connection is going to switch from CS over HSPA to an R99 CS connection. Moreover, the link conversion component 302 can facilitate a handover in the same sector from one radio bearer type to another. It can be appreciated, that during the uplink (from the UE to the NodeB), an R99 CS connection can be preferred when radio condition are degraded since the R99 CS uplink is a bit less signaling and/or scheduling sensitive.

In addition, the link conversion component 302 can also be employed to switch from an R99 CS connection to a CS over HSPA connection when determined that the radio conditions are improved, and/or the UE is stationary or moving at a slower speed. Specifically, the link conversion component 302 can be employed to switch between radio bearer types in a manner, such that, resources are efficiently utilized without compromising voice call quality. Further, in yet another additional aspect, it can be appreciated that the R99 CS and CS over HSPA connections can also operate on different frequency bands and/or on different carriers. For example, a capacity layer of a 1900 UMTS CS over HSPA call can be switched to an 850 carrier R99 CS call (or vice versa) by the link conversion component 302 to provide frequency diversity.

System 300 enables an operator to reap the majority gains of CS over HSPA voice calls, such as, but not limited to, improved Uu and IuB efficiencies, and terminal battery life, while overcoming the coverage limitations of CS over HSPA by converting to an R99 CS connection when necessary (e.g. by the link conversion component 302). Moreover, the system 300 is backward compatible with pre-existing terminals and therefore can be implemented in a substantially short timeframe.

Figure 4:
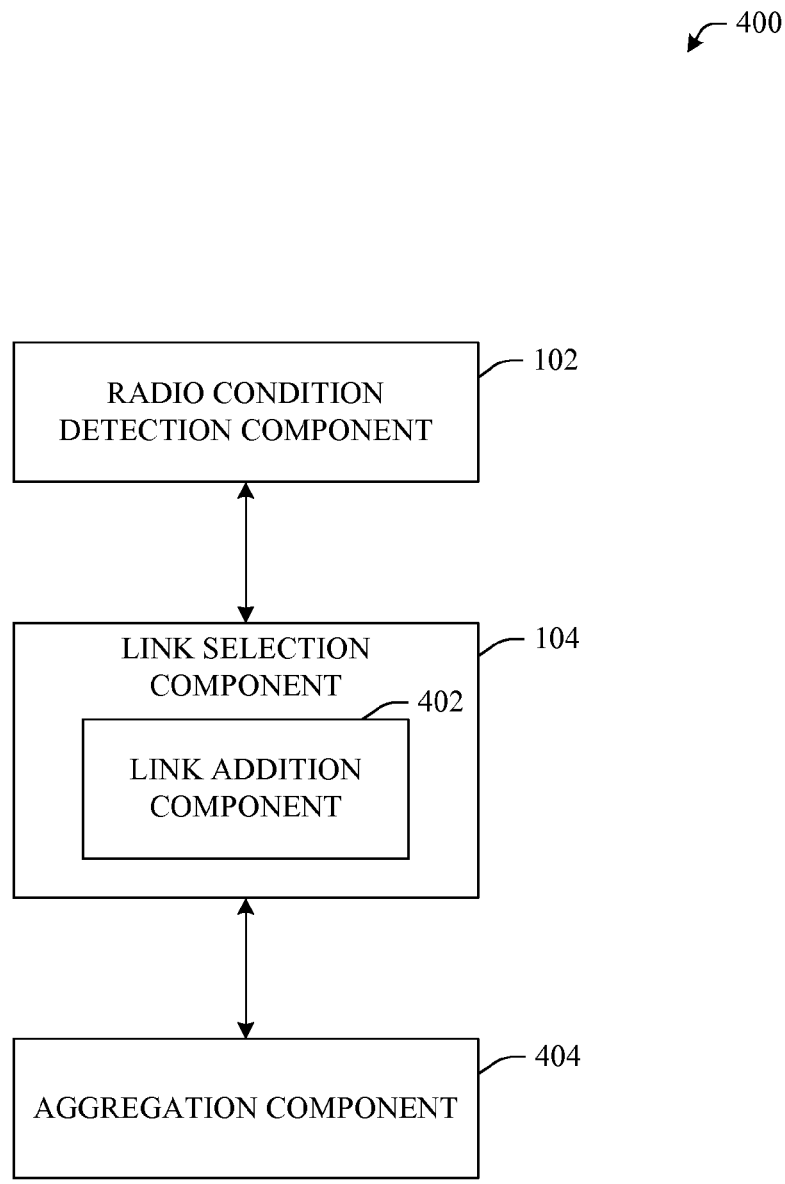
FIG. 4 illustrates an example system that can be employed to enhance effective coverage area and capacity for CS over HSPA traffic, according to an aspect of the subject specification.

Referring to FIG. 4, there illustrated is an example system 400 that can be employed to enhance effective coverage area and capacity for CS over HSPA traffic, according to an aspect of the subject specification. In particular, system 400 can add additional complexity over conventional systems but provides additional gains enhanced coverage, improved reliability in lower signal areas where the signal is unreliable. It can be appreciated that the radio detection component 102 and link selection component 104 can include functionality, as more fully described herein, for example, with regard to systems 100 and 200.

As describe supra, the radio detection component 102 can be employed to monitor of radio conditions, events, UE characteristics (e.g. speed and/or distance from NodeB), etc. and detect any changes therein. In one aspect, the radio detection component 102 can compare the monitored information with a set of thresholds. It can be appreciated that the thresholds can be automatically determined or predefined by an operator to determine when a change in link should occur. Further, the radio condition detection component 102 can send most any change information associated with radio conditions, events and/or UE characteristics to the link selection component 104.

According to an aspect, the link selection component 104 can include a link addition component 402 that can facilitate utilization of concurrent CS over HSPA and R99 CS connections between the UE and NodeB. The link addition component 402 can determine when to switch between a single CS over HSPA connection and concurrent CS over HSPA and R99 CS connections, based in part on an analysis of the change information received from the radio condition detection component 102. As an example, when radio conditions degrade beyond a predefined threshold, the link addition component 402 can switch from a single CS over HSPA connection to concurrent CS over HSPA and R99 CS connections. Thus, the link addition component 402 can provide an additional link to user data between the NodeB and the UE. The additional link can add redundancy and provide improved data quality.

In accordance with one embodiment, the link addition component 402 can send the UE a radio bearer addition message that can include information associated with the additional channel. For example, the message can indicate that a concurrent R99 CS connection will be added to provide redundancy. The link addition component 402 can transmit speech (and/or data) and signaling frames to the UE on both CS over HSPA and R99 CS connections. Accordingly the UE, can receive data over both connections and employ various aggregation techniques (described in detail infra with respect to FIG. 7) to recover the single stream of data.

Further, the UE can also transmit information to the NodeB concurrently via both the CS over HSPA and R99 CS connections. Accordingly, system 400 includes an aggregation component 404 that can be employed to receive and combine data from both streams. In one example, the aggregation component 404 can select data from a single stream or employ various mechanisms, such as, but not limited to, maximal ratio combining, time warping, jitter buffering, etc. to combine and/or align the data received from both the connections. In addition to the link diversity, time diversity associated with the jitter on each connection can also be employed. It can be appreciated that although both HSUPA (High-Speed Uplink Packet Access) and R99 CS enable soft handovers (SHO), the concurrent CS over HSPA and R99 CS connections in the uplink can provide robustness associated with user scheduling. For example, in HSUPA, signaling is typically employed for user scheduling. If the HSUPA user scheduling signaling breaks down (for e.g. in degraded radio conditions), the user data pipe can also break down. On the other hand, R99 uplink is a bit less signaling and/or scheduling sensitive, and can thus compensate for deficiencies of HSUPA in sub-optimal or degraded radio conditions. Furthermore, due to retransmission feature of HSPA a third redundant stream of data can be sent to the UE that can be utilized at the UE to recover user data by employing combination schemes, such as, but not limited to time warping. Techniques, such as, but not limited to, jitter buffering and time warping can help in getting aligning and/or combining the retransmissions.

In accordance with an additional aspect, the user data can be delivered over the two connections (CS over HSPA and R99 CS), by the link addition component 402, on different frequency bands and/or on different carriers to provide frequency diversity. As an example, a capacity layer of an 850 UMTS CS over HSPA call can be transmitted concurrently with a 1900 carrier R99 CS call or vice versa. Thus, the UE can receive data associated with the same call from a 1900 carrier R99 CS and 850 CS over HSPA concurrently.

The system 400 enables an operator/service provider to reap gains of employing CS over HSPA, and, in addition, can improve the CS coverage footprint of the network, which in turn provides improved customer experience, lower churn and reduced capital expenditure. The concurrent existence of both CS over HSPA and R99 CS links that carry the same signaling and user data can also reduce dropped calls in areas of poor radio conditions, which are inherently least reliable.

Further, the tradeoff to capacity is minimal given that the concurrent states can be entered only under marginal and/or poor radio conditions.

Figure 5:
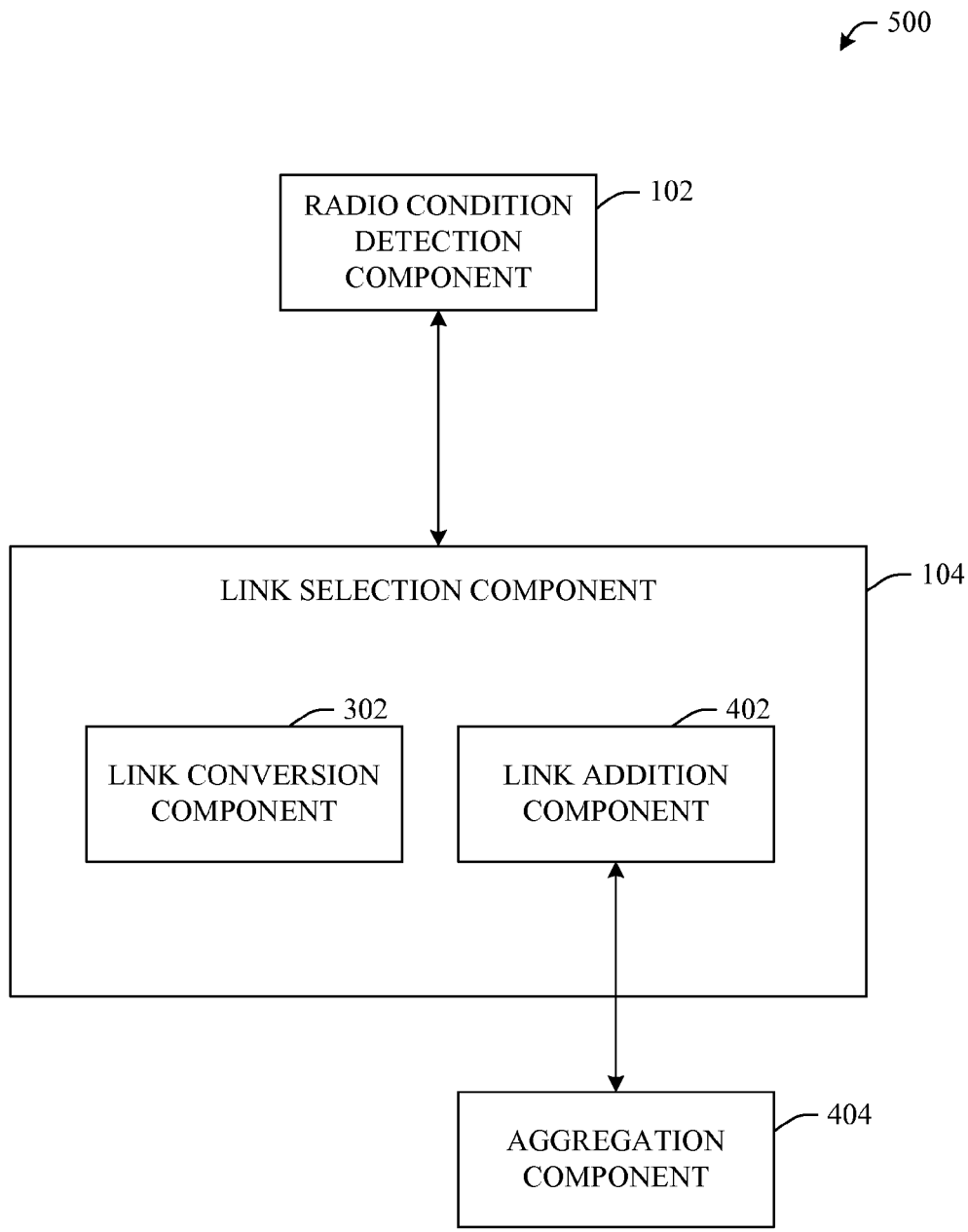
FIG. 5 illustrates an example system that provides link diversity for capacity and coverage enhancement in a wireless communication system by intelligently selecting between converting from one radio bearer type to another, and, employing an additional radio bearer to transmit the data concurrently, according to an aspect of the subject disclosure.

Referring now to FIG. 5, there illustrated is an example system 500 that provides link diversity for capacity and coverage enhancement in a wireless communication system (e.g. UMTS) by intelligently selecting between, converting from one radio bearer type to another, and, employing an additional radio bearer to transmit the data concurrently, according to an aspect of the subject disclosure. It can be appreciated that the radio detection component 102, link selection component 104, link conversion component 302, link addition component 402 and aggregation component 404 can include functionality, as more fully described herein, for example, with regard to systems 100, 200, 300 and 400 respectively.

The link selection component 104 can determine whether the radio bearer for user data can be converted to another type of radio bearer, or, whether an additional radio bearer can be employed to transmit the user data to a UE. According to an embodiment, the determination can be based on information received from the radio condition detection component 102 that includes, but is not limited to, current radio conditions, event information, UE characteristics, etc. Specifically, the link selection component 104 can analyze the received information and select an optimal transport mechanism to transmit user data. The optimization can enable efficient utilization of resources and improved quality and reliability. In one aspect, the link selection component 104 can determine that the optimal transport mechanism can be provided by switching the radio bearer and accordingly the link conversion component 302 can switch to a new radio bearer. For example, when radio conditions degrade beyond a threshold but are still within another threshold, the link selection component 104 can activate the link conversion component 302 to switch from a CS over HSPA to an R99 CS connection. In another aspect, the link selection component 104 can determine that the optimal transport mechanism can be provided by the addition of another radio bearer that can concurrently transmit the user data. Accordingly, the link addition component 402 can concurrently transmit user data on an additional radio bearer. For example, when radio conditions degrade beyond both thresholds, the link selection component 104 can activate the link addition component 402 to transmit user data to the UE on both CS over HSPA and R99 CS connections.

The thresholds can be specified by an operator and/or service provider. In one aspect, the operator can select existing thresholds to switch to or tag on a new radio bearer by employing a Graphical User Interface (GUI) (not shown). It can be appreciated that a new threshold can also be created and set by the operator. For example, conventional systems allow an operator to select options (e.g. GSM_Preferred, IFHO_Preferred or None) for hard handovers when a UE drops below 2d. System 500 enables selection of two addition options, namely, R99 CS and R99 CS along with CS over HSPA. If the R99 CS option is selected then, when an e2d event is received from the UE at NodeB, a reconfiguration from a CS over HSPA to an R99 CS connection can occur. Similarly, if the R99 CS along with CS over HSPA option is selected then, when an e2d event is received from the UE at NodeB, an R99 CS connection can be established with the UE in addition to the CS over HSPA connection and the user data (e.g., voice call information) can be transmitted concurrently over both connections. It can be appreciated that a similar GUI can be utilized for setting thresholds with respect to system 300 and system 400. Specifically, system 300 can enable selection an additional R99 CS option and system 400 can enable selection of an additional R99 CS along with CS over HSPA option.

Figure 6:
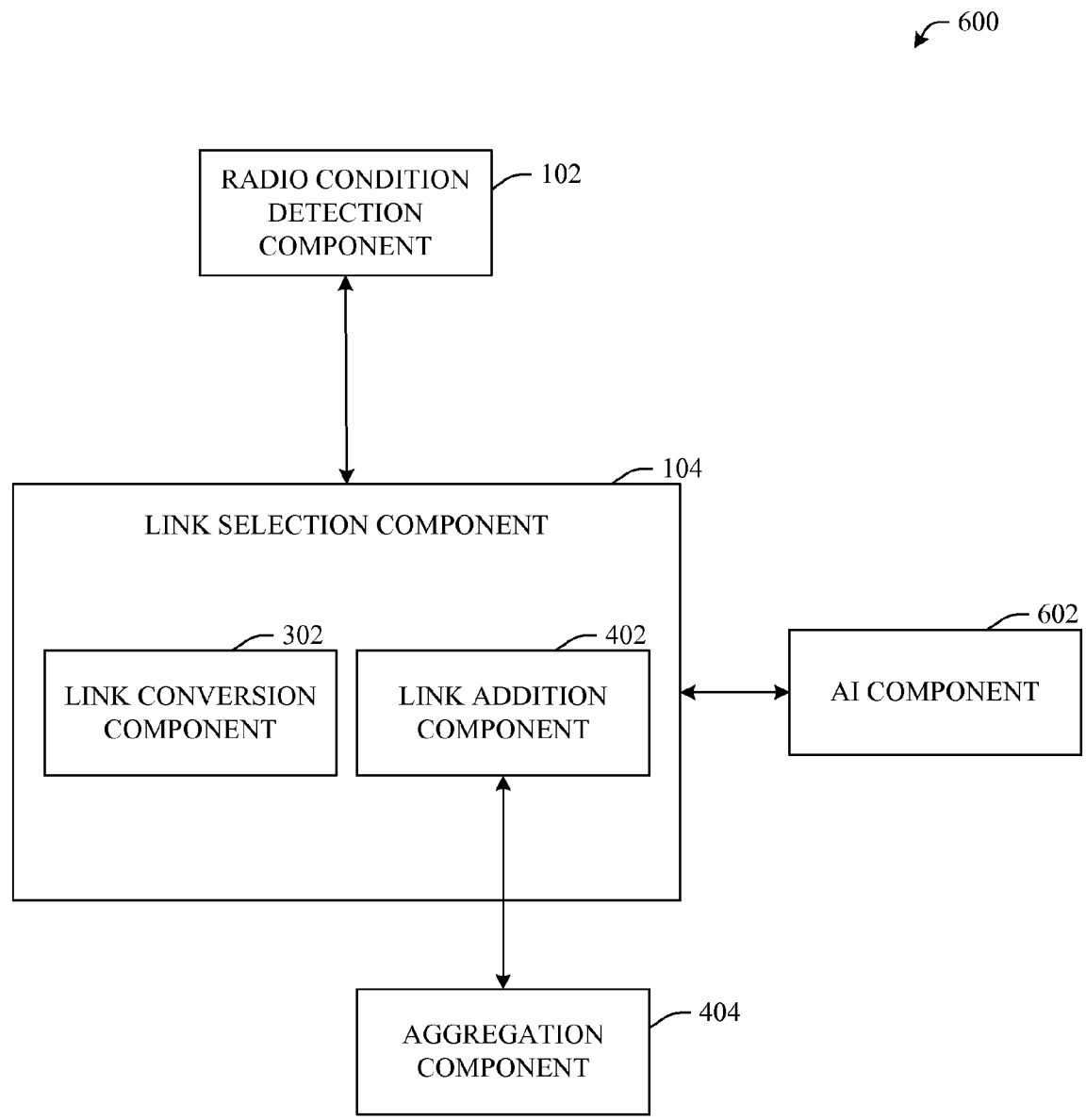
FIG. 6 illustrates an example system that facilitates automating one or more features in accordance with the subject innovation.

FIG. 6 illustrates an example system 600 that employs an artificial intelligence (AI) component 602, which facilitates automating one or more features in accordance with the subject innovation. It can be appreciated that the radio detection component 102, link selection component 104, link conversion component 302, link addition component 402 and aggregation component 404 can include functionality, as more fully described herein, for example, with regard to systems 100, 200, 300, 400 and 500 respectively.

The subject innovation (e.g., in connection with link selection) can employ various AI-based schemes for carrying out various aspects thereof. For example, a process for determining whether the radio bearer for user data can be converted to another type of radio bearer, or, whether an additional radio bearer can be employed to transmit user data to a UE can be facilitated via an automatic classifier system and process. For example, during voice call in a UMTS, the classifier can be employed to determine whether a voice call can be transmitted between the NodeB and the UE by employing a CS over HSPA connection, an R99 CS connection or a CS over HSPA connection along with an R99 CS connection. In another aspect, the classifier can be employed to determine a transport mechanisms (e.g. CS over HSPA connection, an R99 CS connection or a CS over HSPA connection along with an R99 CS connection) that can be employed during a primary transmission and during a retransmission, such that utilization of CS over HSPA is optimized. Further, the classifier can be employed to determine transitions between the various transport mechanism to achieve optimized power reduction and/or latency improvement. In addition, the classifier can optimize the transition thresholds automatically.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g. factoring into the analysis utilities and costs) to prognose or infer an action that a user desires to be automatically performed. In the case of communication systems, for example, attributes can be events or change information determined by the radio condition detection component 102, and the classes can be categories or areas of interest (e.g. levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g. via a generic training data) as well as implicitly trained (e.g. via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria which of a CS over HSPA connection, an R99 CS connection, or a CS over HSPA connection along with an R99 CS connection, can be utilized for delivering user data between a NodeB and a UE, such that resources are efficiently utilized and data quality is maintained.

Figure 7:
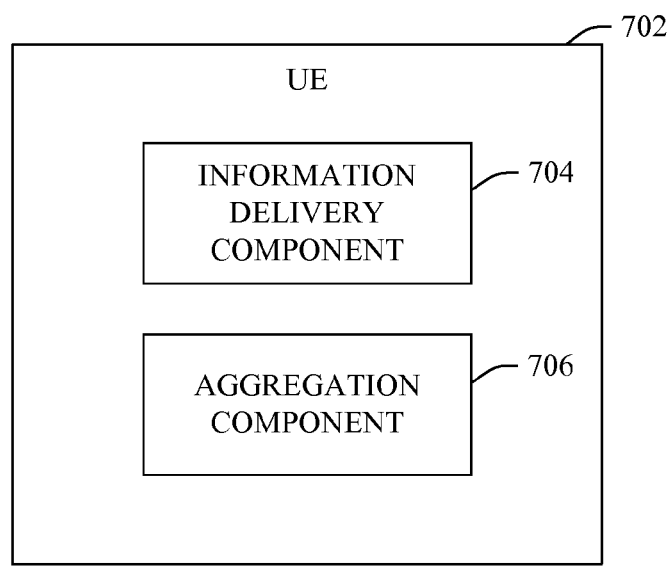
FIG. 7 illustrates an example system that can receive (and transmit) information from a NodeB by employing adaptive R99 CS and CS over HSPA link diversity, according to an aspect of the subject innovation.

Referring now to FIG. 7, there illustrated is an example system 700 that can receive (and/or transmit) information from NodeB by employing adaptive R99 CS and CS over HSPA link diversity, according to an aspect of the subject innovation. System 700 can include a UE 702 that can include most any electronic device that can connect wirelessly to the NodeB, such as, but not limited to, mobile phones, media players, digital cameras, media recorders, laptops, PDAs (personal digital assistants), personal computers, digital photo frames, GPS module, gaming module, etc. Further, the UE 702 can receive voice calls from the NodeB. Furthermore, it can be appreciated the UE 702 can be mobile, stationary, and/or have limited mobility and can employed, for example, in a home, office, building, factory, warehouse, etc.

The UE 702 can include an information delivery component 704 that can be employed to transmit event related information to the NodeB, such as, but not limited to, information associated with event 2d, 5A and/or HS TX Power/UE TX power. Further, the information delivery component 704 can transmit information associated UE characteristics, such as, but not limited to, current speed of the UE 702 or distance of the UE 702 from the NodeB. In addition, the information delivery component 704 can be employed to receive information from the NodeB regarding a switch in transport mechanism or addition of a new link for added redundancy.

An aggregation component 706 in the UE 702 is capable of maintaining concurrent CS over HSPA and R99 CS connections, such that, the UE 702 in the downlink (DL) and the NodeB in the uplink (UL) can receive the same voice bits over two different and/or distinct channels. In one example, the aggregation component 706 can combine and/or align the voice bits from the disparate channels to generate more reliable voice bits. Moreover, the aggregation component 706 can employ a maximal ratio combining or another mechanism for aligning the streams. In one aspect, the aggregation component 706 can identify which of the two data streams is better and/or more reliable and utilize data from that stream or can combine the two streams to create a single audio stream. As an example, the CS over HSPA data stream can contain more jitter than the R99 CS data stream. Thus, the aggregation component 706 can employ most any jitter buffering and/or time warping techniques to generate a recovered data stream from the data provided by both streams. It can be appreciated that the aggregation component 404 (FIG. 4) can be substantially similar to aggregation component 706 and can include functionality thereof.

Figure 8:
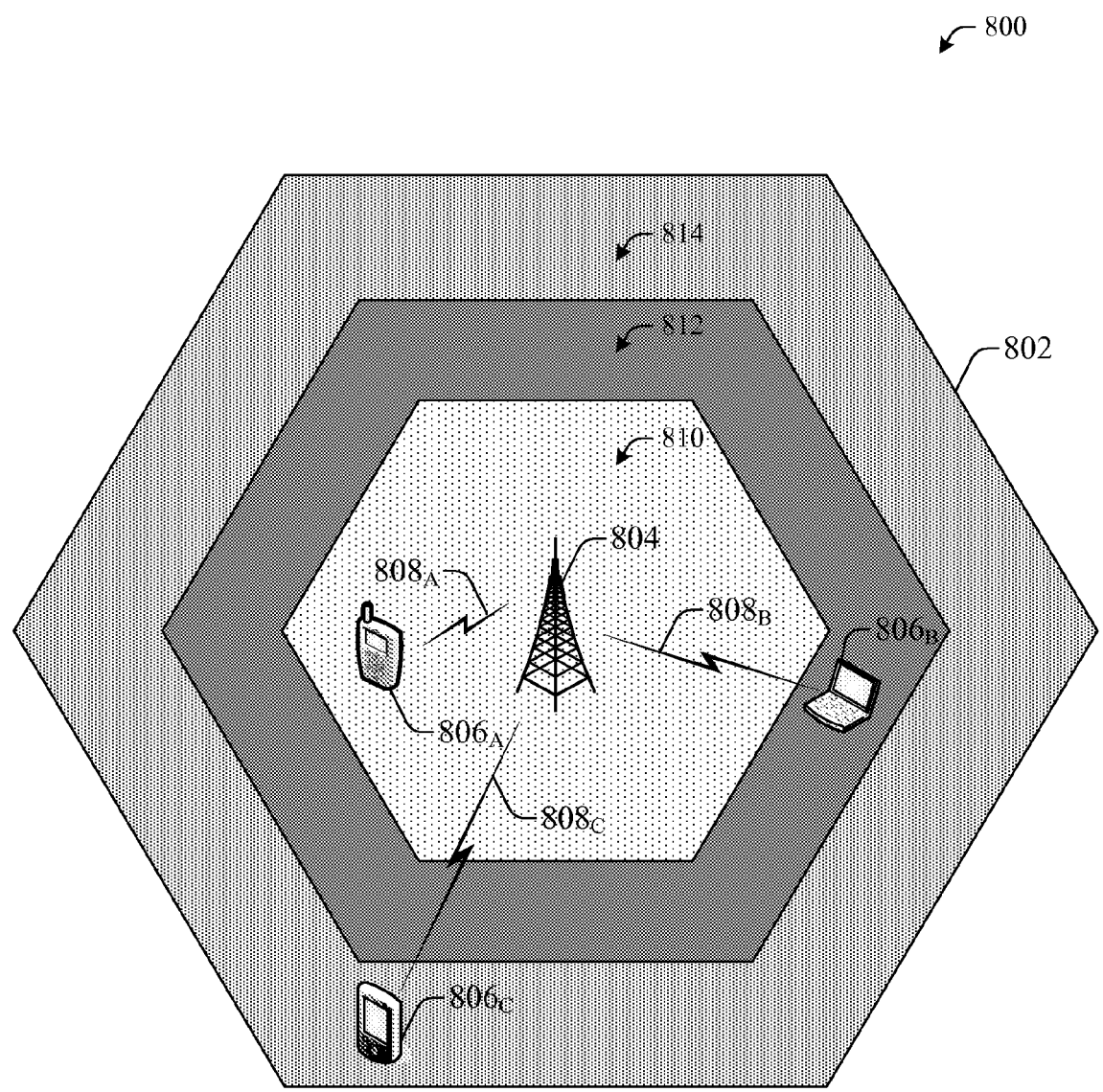
FIG. 8 illustrates a schematic wireless environment that implements adaptive R99 CS and CS over HSPA link diversity in accordance with aspects described in the subject specification.
Figure 8:
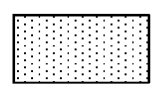
Figure 8:
Figure 8:
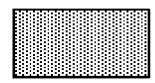

FIG. 8 illustrates a schematic wireless environment (e.g. a network) 800 in accordance with aspects described in the subject specification. In wireless environment 800, area 802 represents a coverage cell, which can be served by a NodeB 804. It should be appreciated that cell 802 is illustrated as a hexagon; however, cell(s) can adopt other geometries generally dictated by the deployment or footprint, geographic areas to be covered, and so on.

The NodeB 804 can service wireless devices, such as UE $806_A$, $806_B$ and $806_C$ via an over-the-air wireless links $808_A$, $808_B$ and $808_C$ respectively. The wireless links ($808_A$, $808_B$ and $808_C$) can comprise a downlink (DL) and an uplink (UL), and can utilize a predetermined band of the radio frequency (RF) spectrum. In an aspect, the UE ($806_A$, $806_B$ and $806_C$) can include most any electronic device that employs wireless communication, such as, but not limited to a cellular telephone, a cordless telephone, a Session Initiation Protocol (SIP) phone, a wireless local loop (WLL) station, a personal digital assistant (PDA), a handheld device having wireless connection capability, a laptop, computing device, or other processing device connected to a wireless modem, a media player, a media recorder, a camera, etc., or a combination thereof.

According to an aspect, cell 802 can have three regions of coverage (810, 812, 814), wherein the innermost-region 810 that is closest to NodeB 804 can employ a CS over HSPA connection; the mid-region 812 can employ an R99 CS connection and the outermost-region 814 that is near to the edge of the cell can be employ a combination of CS over HSPA and R99 CS connections for communications between the NodeB 804 and UE ($806_A$, $806_B$ and $806_C$ respectively). Specifically, radio conditions associated with a UE ($806_A$, $806_B$ and $806_C$) can be dynamically determined (e.g. by the radio condition detection component 102 in FIG. 1) and based on the determined information an appropriate transport mechanism can be selected (e.g. by the link selection component 104 in FIG. 1) for efficient utilization of resources.

In one example, UE $806_A$ can be located in region $808_A$ wherein radio conditions can be good enough to support voice calls by employing a CS over HSPA connection $808_A$ and, efficiently utilize resources and improve battery life of UE $806_A$. Further, UE $806_B$ can be located in region $808_B$ wherein radio conditions can degrade beyond a first threshold and thus an R99 CS connection $808_B$ can be employed for communication to achieve enhanced coverage. Furthermore, UE $806_C$ can be located in region $808_C$ wherein radio conditions can degrade beyond a second threshold and thus a combination of CS over HSPA and R99 CS connection $808_C$ can be employed for communication. The redundant CS over HSPA connection can help in situations wherein cell sites (not shown) are distant from each other and overlap does not occur. Moreover, when UE $806_A$ moves from region $808_A$ to region $808_B$, the transport mechanism can be converted from CS over HSPA to R99 CS (e.g. by the link conversion component 302 in FIG. 3) and vice versa. Further, when the UE $806_A$ moves from region $808_A$ (or $808_B$) to region $808_C$, the transport mechanism can be converted from CS over HSPA (or R99 CS) to a combined CS over HSPA and R99 CS connection (e.g. by the link addition component in 402 FIG. 4) and vice versa.

It can be appreciated that UE characteristics, such as speed of the UE can also be employed to determine the type of link ($808_A$, $808_B$ and $808_C$) employed. For example, an R99 CS link $808_B$ can be employed for a UE moving at a high speed, such that, soft hand over (SHO) can be utilized and a CS over HSPA link $808_A$ can be employed for a slow moving or stationary UE.

FIGS. 9-12 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 9:
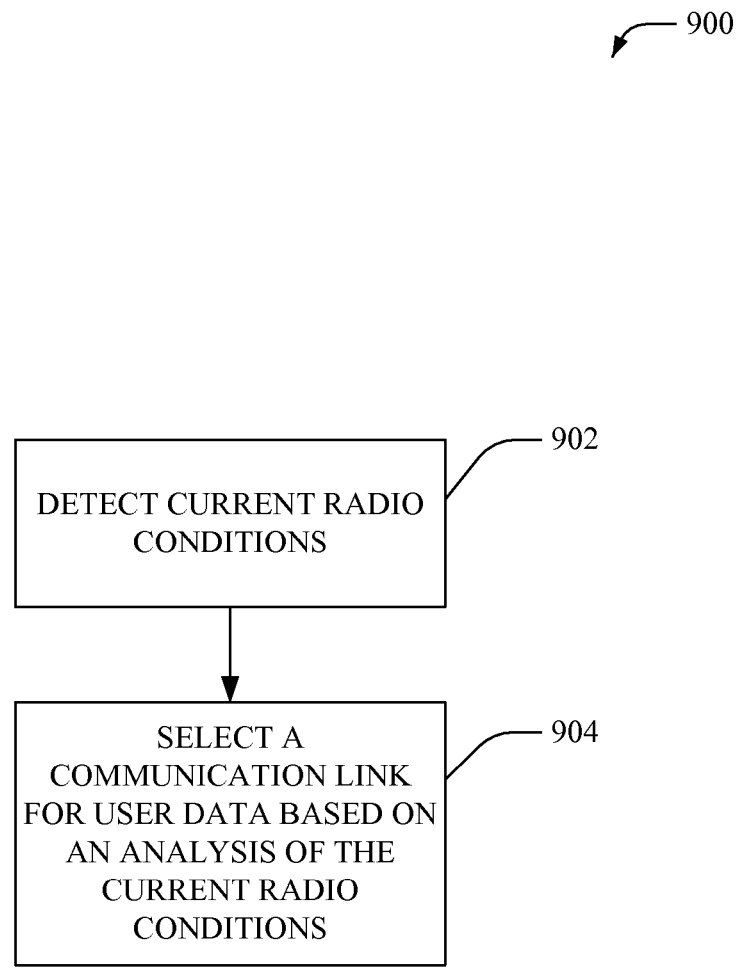
FIG. 9 illustrates an example methodology that facilitates capacity and coverage enhancement in wireless communication systems in accordance with an aspect of the subject disclosure.

Referring now to FIG. 9, there illustrated is an example methodology 900 that facilitates capacity and coverage enhancement in a wireless communication system (e.g. UMTS) in accordance with an aspect of the subject disclosure. Moreover, at 902, current radio conditions between a NodeB and UE associated with user data can be detected. For example, changes in radio condition can be determined based on one or more thresholds that are defined by an operator or automatically determined by employing a machine learning technique. Additionally various other factors, such as, but not limited to events or current UE characteristics (e.g. speed and/or distance of the UE) can be identified. At 904, a communication link for transmitting user data between the NodeB and UE can be selected based on an analysis of the detected information. In one aspect, a CS over HSPA connection can employed for communication between the NodeB and UE, and the CS over HSPA connection can be converted to R99 CS connection when degraded radio conditions are detected. Moreover, when radio conditions improve, the R99 CS communication can be re-converted to a CS over HSPA communication. In another aspect, concurrent transport mechanisms, for example, a CS over HSPA connection and an R99 CS connection can be utilized to provide increased reliability for user data, when detected that radio conditions are degraded. Further, when detected that the radio conditions have improved, a single CS over HSPA connection can be utilized.

Figure 10:
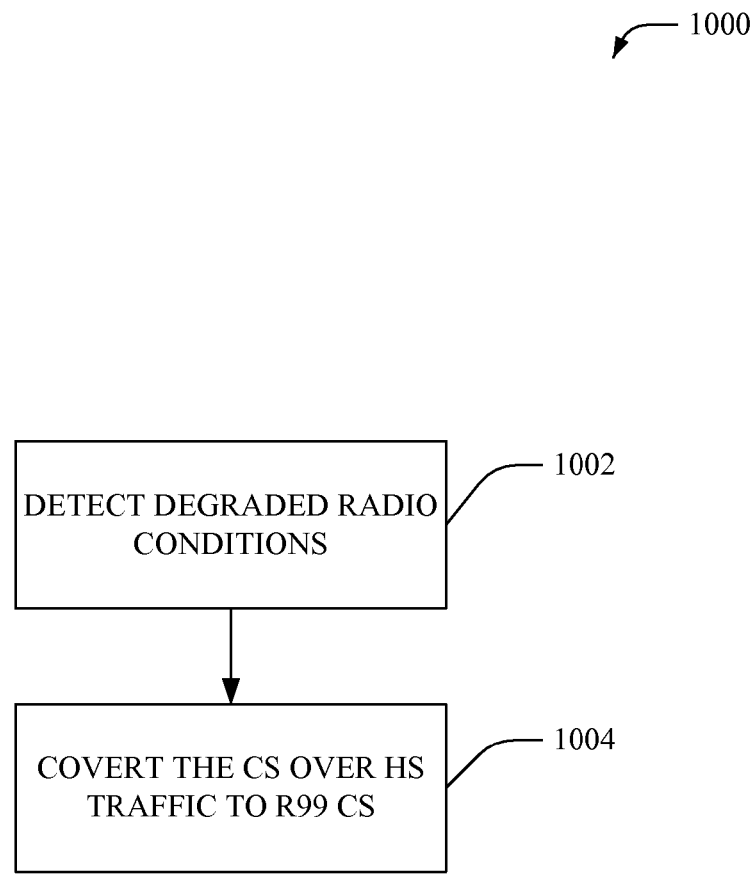
FIG. 10 illustrates an example methodology that can be employed to improve effective coverage area by converting a CS over HSPA connection to an R99 CS connection in accordance with an aspect of the subject innovation.

FIG. 10 illustrates an example methodology 1000 that can be employed to improve effective coverage area by converting a CS over HSPA connection to an R99 CS connection in accordance with an aspect of the subject innovation. At 1002, degraded radio conditions including events, UE characteristics (e.g. speed and/or distance from NodeB), etc. can be detected. Moreover, transport mechanisms between the NodeB and UE can be reconfigured, such that, resources are efficiently utilized and/or quality of a voice call does not degrade. At 1004, CS over HSPA traffic can be reconfigured to employ R99 CS when determined that radio conditions have degraded, for example, beyond a predetermined threshold. Additionally, a CS over HSPA connection can be converted to an R99 CS connection when determined that the UE is moving at a high speed, or when determined that the number of retransmissions has exceeded a predefined threshold. It can be appreciated that, the R99 CS connection can be switched back to the CS over HSPA connection when radio conditions improve, and/or the UE is stationary or moving at a slower speed.

Figure 11:
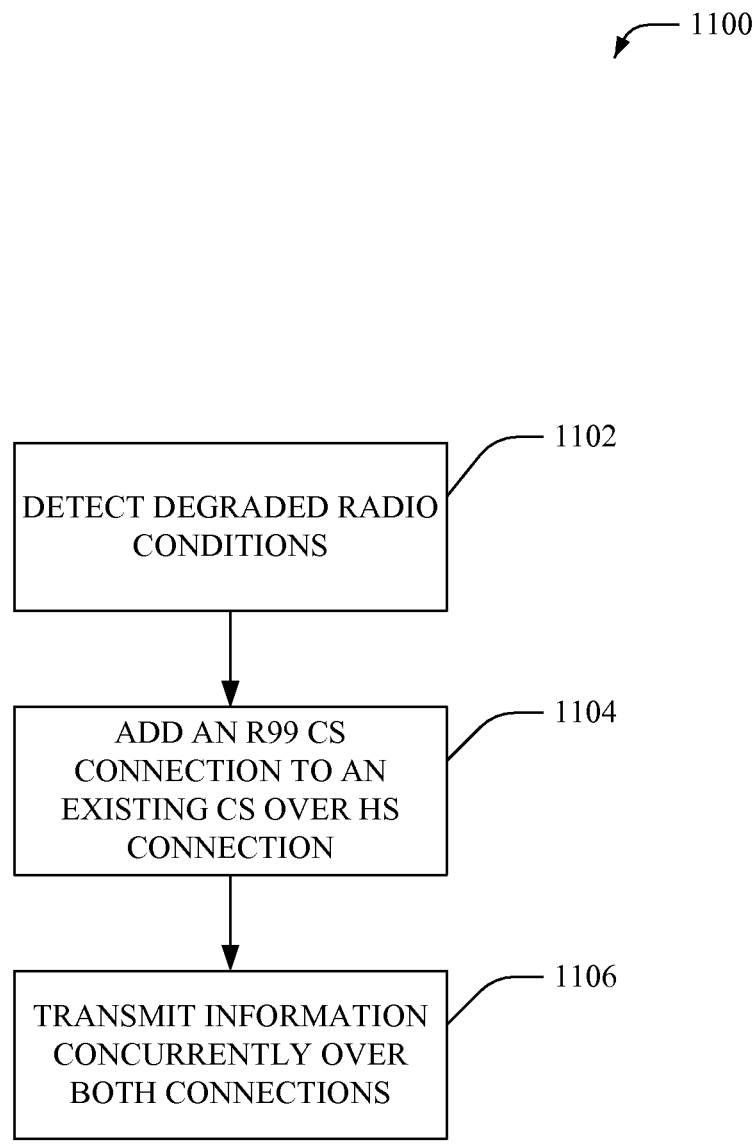
FIG. 11 illustrates an example methodology that can be employed to enhance effective coverage area and capacity for CS over HSPA voice calls by providing an additional R99 CS connection for communication, according to an aspect of the subject specification.

Referring to FIG. 11, there illustrated is an example methodology 1100 that can be employed to enhance effective coverage area and capacity for CS over HSPA voice calls by providing an additional R99 CS connection for communication, according to an aspect of the subject specification. At 1102, degraded radio conditions can be determined for a CS over HSPA connection, for example, based on comparison of current radio conditions, events, UE characteristics (e.g. speed and/or distance from NodeB), etc. with a set of thresholds. At 1104, an R99 CS connection can be added to the existing CS over HSPA connection. Moreover, an additional link to transmit voice call information between the NodeB and the UE can be provided that can facilitate improved voice quality. At 1106, information (e.g. speech and signaling frames) can be transmitted between the NodeB and the UE concurrently on both CS over HSPA and R99 CS connections. Accordingly, data can be received via both connections and one or more aggregation techniques can be employed to recover the single stream of data.

Figure 12:
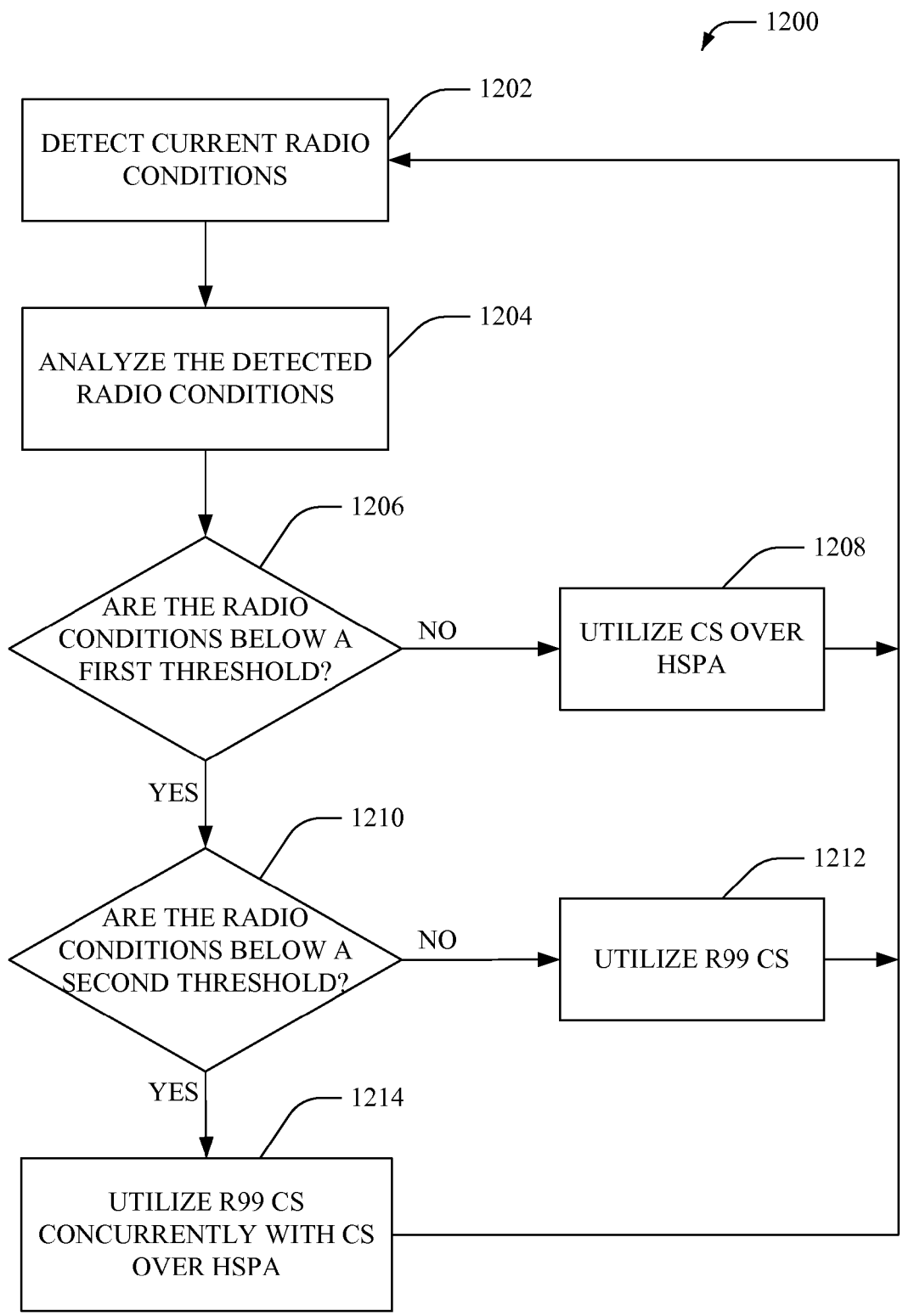
FIG. 12 illustrates an example methodology that facilitates selection of a new or additional radio bearer to transmit the data between a NodeB and a UE and provide link diversity for capacity and coverage enhancement in UMTS in accordance with an aspect of the subject disclosure.

FIG. 12, there illustrated is an example methodology 1200 that provides selection of a new or additional radio bearer to transmit user data between a NodeB and UE and provide link diversity for capacity and coverage enhancement in UMTS in accordance with an aspect of the subject disclosure. At 1202, current radio conditions can be detected associated with communication between a NodeB and a UE. In addition, event data, UE speed, UE distance, etc. can also be identified. At 1204, the detected radio conditions can be analyzed. At 1206, it can be determined whether the radio conditions have degraded below a first predefined threshold based on the analysis information. For example, an operator and/or service provider can specify the threshold.

According to an aspect, if radio conditions have not degraded below the first threshold, at 1208, a CS over HSPA connection can be utilized for communication between the NodeB and the UE, such that, Uu and IuB efficiencies and battery life of the UE are increased. Further, at 1210, it can be determined whether the radio conditions have degraded below a second threshold based on the analysis information. In one example, the first threshold can be greater than the second threshold and both can be predefined by employing a GUI. If the radio conditions lie between the first and second thresholds, then an R99 CS connection can be employed for communication between the NodeB and the UE, as shown at 1212. The R99 CS connection can employ SHO and enhance effective coverage area. Alternately, at 1216, if the radio conditions have degraded below the second predefined threshold an R99 CS connection is concurrently employed with a CS over HSPA connection for communication between the NodeB and the UE. Accordingly, voice call data can be transmitted between the NodeB and the UE concurrently on both CS over HSPA and R99 CS connections. The additional connection can provide redundancy and improve reliability.

Figure 13:
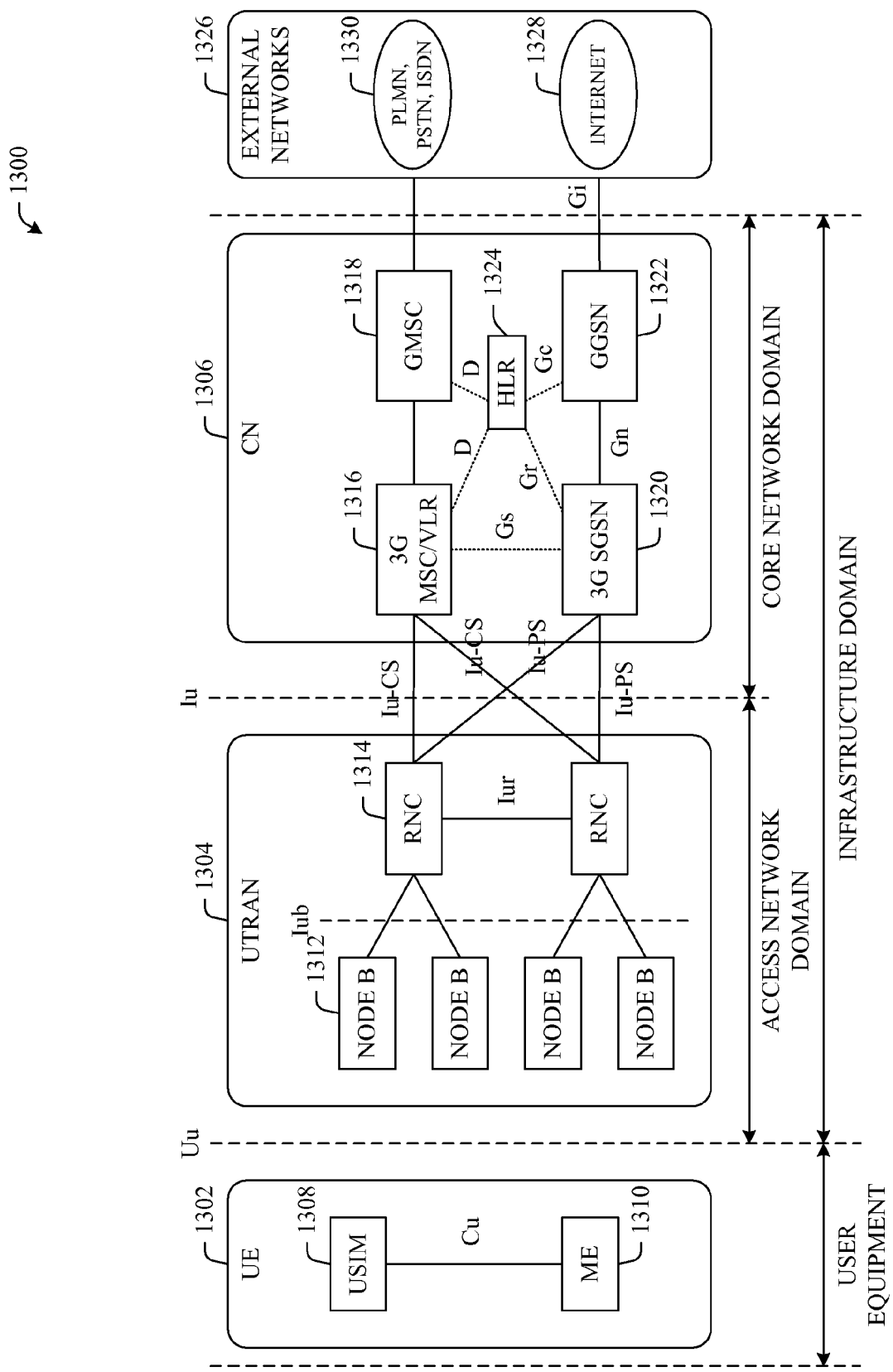
FIG. 13 illustrates an exemplary UMTS network that facilitates adaptive link diversity in accordance with the subject innovation.

FIG. 13 illustrates an exemplary UMTS network 1300 that facilitates adaptive link diversity in accordance with the subject innovation. The architecture is based on the 3GPP (Third Generation Partnership Project) Release 99 specification. However, it is to be understood that the subject innovation can be applied to any UMTS telecommunications architecture, including by way of example, Release 5 (R5) and, R5 and Release 6 (R6) 3GPP standards. UMTS offers teleservices (e.g., speech and/or SMS-Short Message Service) and bearer services, which provide the capability for information transfer between access points. Negotiation and renegotiation of the characteristics of a bearer service can be performed at session or connection establishment, and during an ongoing session or connection. Both connection oriented and connectionless services can be offered for point-to-point and point-to-multipoint communications.

The following frequencies 1885-2025 MHz and 2110-2200 MHz can be allocated for UMTS use. However, the innovative aspects described herein can also be applied to other frequency bands. Bearer services can have different QoS (quality-of-service) parameters for maximum transfer delay, delay variation and bit error rate. Offered data rate targets are: 144 kbps satellite and rural outdoor; 384 kbps urban outdoor; and 2048 kbps indoor and low range outdoor.

UMTS network services can have different QoS classes for four types of traffic: conversational class (e.g., voice, video telephony, video gaming); streaming class (e.g., multimedia, video on demand, webcast); interactive class (e.g., web browsing, network gaming, database access); and background class (e.g., email, SMS, downloading).

UMTS can also support have a virtual home environment, which is a concept for portability across network boundaries and between terminals in a personal service environment. Personal service environment means that users are consistently presented with the same personalized features, user interface customization and services in whatever network or terminal, wherever the user may be located. UMTS also includes network security and location based services.

The UMTS network 1300 can consist of three interacting domains; a user equipment (UE) domain 1302, a UMTS Terrestrial Radio Access Network (UTRAN) domain 1304, and a core network (CN) domain 1306. The UTRAN domain 1304 is also referred to as the access network domain and the CN 1306 is referred to as the core network domain, the both of which comprise an infrastructure domain.

The UE domain 1302 includes a USIM (user services identity module) domain and an ME (mobile equipment) domain. User equipment is the equipment used by the user to access UMTS services. In the UE domain 1302, the UMTS IC card is the USIM 1308, which has the same physical characteristics as GSM SIM (subscriber identity module) card. The USIM interfaces to ME 1310 via a Cu reference point. Functions of the USIM include: support of one USIM application (and optionally, more than one); support of one or more user profiles on the USIM; update of USIM specific information over the air; security functions; user authentication; optional inclusion of payment methods; and optional secure downloading of new applications.

UE terminals work as an air interface counter part for Node-B devices of the access network and have many different types of identities. Following are some of the UMTS identity types, which are taken directly from GSM specifications: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV).

A UMTS mobile station (MS) can operate in one of three modes of operation. A PS/CS mode of operation is where the MS is attached to both the PS (packet-switched) domain and CS (circuit-switched) domain, and the MS is capable of simultaneously operating PS services and CS services. A PS mode of operation is where the MS is attached to the PS domain only, and can only operate services of the PS domain. However, this does not prevent CS-like services from being offered over the PS domain (e.g., VoIP). In a third CS mode of operation, the MS is attached to the CS domain only, and can only operate services of the CS domain.

The UTRAN 1304 provides the air interface access method for the UE domain 1302. The reference point between the UE domain and the infrastructure domain is the Uu UMTS radio interface. The access network domain provides the physical entities that manage resources of the access network and facilitates access to the core network domain. In UMTS terminology, a base station of the access network domain is referred as a Node-B device 1312, and control equipment for Node-B devices is called a radio network controller (RNC) 1314. The interface between the Node-B device and the RNC 1314 is the IuB interface. The interface between two RNCs is called the Iur interface. According to an aspect, the adaptive R99 CS and CS over HSPA Link diversity that facilitates enhanced coverage and capacity, described in detail supra, can be implemented in the UTRAN 1304.

The functions of Node-B devices include: air interface transmission/reception; modulation and demodulation; CDMA (Code Division Multiple Access) physical channel coding; micro diversity; error handing; and closed loop power control. The functions of the RNC include: radio resource control; admission control; channel allocation; power control settings; handover control; macro diversity; ciphering; segmentation and reassembly; broadcast signaling; and open loop power control.

Wideband CDMA (WCDMA) technology was selected for UTRAN air interface. UMTS WCDMA is a direct sequence CDMA system where user data is multiplied with quasi-random bits derived from WCDMA spreading codes. In UMTS, in addition to channelization, codes are used for synchronization and scrambling. WCDMA has two basic modes of operation: frequency division duplex (FDD) and time division duplex (TDD).

The Core Network is divided in circuit-switched and packet-switched domains. Some of the circuit-switched elements are a mobile services switching center (MSC) and visitor location register (VLR) 1316 and gateway MSC (GMSC) 1318. Packet-switched elements include a serving GPRS support node (SGSN) 1320 and gateway GPRS support node (GGSN) 1322. Some network elements such as an EIR (equipment identity register) (not shown), HLR (home location register) 1324, VLR and AuC (authentication center) (not shown) can be shared by both domains.

A function of the CN 1302 is to provide switching, routing and transit for user traffic. The CN 1302 also contains the databases and network management functions. The basic CN architecture for UMTS is based on the GSM network with GPRS (general packet radio service) capability. All equipment is modified for UMTS operation and services. The radio access network has several interfaces that can be configured and dimensioned. The CN 1306 interfaces to the radio access domain via an Iu interface. An Iu-CS (circuit-switched) reference point interfaces an RNC of the access network to the MSC/VLR entity 1316 of the CN 1306 for voice from/to the MSC/VLR 1316. An Iu-PS (packet-switched) reference point interfaces an RNC of the access network to the SGSN entity 1320 of the CN 1306 for data from/to the SGSN 1320.

In the CN 1306, a Gs interface is provided between the MSC/VLR 1316 and the SGSN. A Gn interface is provided between the SGSN 1320 and the GGSN 1322. A D interface is provided between the MSC/VLR 1316 and the HLR 1324, and the HLR 1324 and the GMSC 1318. A Gr interface is provided between the SGSN 1320 and the HLR 1324. A Gc interface is provided between the GGSN 1322 and the HLR 1324.

The CN 1306 provides the interface from the UE domain 1302 to external networks 1326 such as the Internet 1328 via a Gi interface from the GGSN 1322, and other networks 1330 via the GMSC 1318, which can include a PLMN (public land mobile network), PSTN (public switched telephone network) and ISDN (integrated service digital network) networks.

Asynchronous Transfer Mode (ATM) is defined for UMTS core transmission. ATM Adaptation Layer type 2 (AAL2) handles circuit-switched connection, and packet connection protocol AAL5 is designed for data delivery.

The architecture of the CN 1306 can change when new services and features are introduced. Number Portability Database (NPDB), for example, can be used to enable a user to change the network while keeping their old phone number. A gateway location register (GLR) can be employed to optimize the subscriber handling between network boundaries. Additionally, the MSC/VLR and SGSN can merge to become a UMTS MSC.

Summarizing the UMTS frequencies, 1920-1980 MHz and 2130-2170 MHz are employed for FDD and WCDMA.

Paired uplink and downlink channel spacing can be 5 MHz and raster is 200 kHz. An operator can use 3-4 channels (2×15 MHz or 2×20 MHz) to build a high-speed, high-capacity network. Frequencies 1900-1920 MHz and 2010-2025 MHz are for TDD and TD/CDMA. Unpaired channel spacing can be 5 MHz and raster is 200 kHz. Transmit and receive are not separated in frequency. Frequencies 1980-2010 MHz and 2170-2200 MHz are employed for satellite uplink and downlink.

Figure 14:
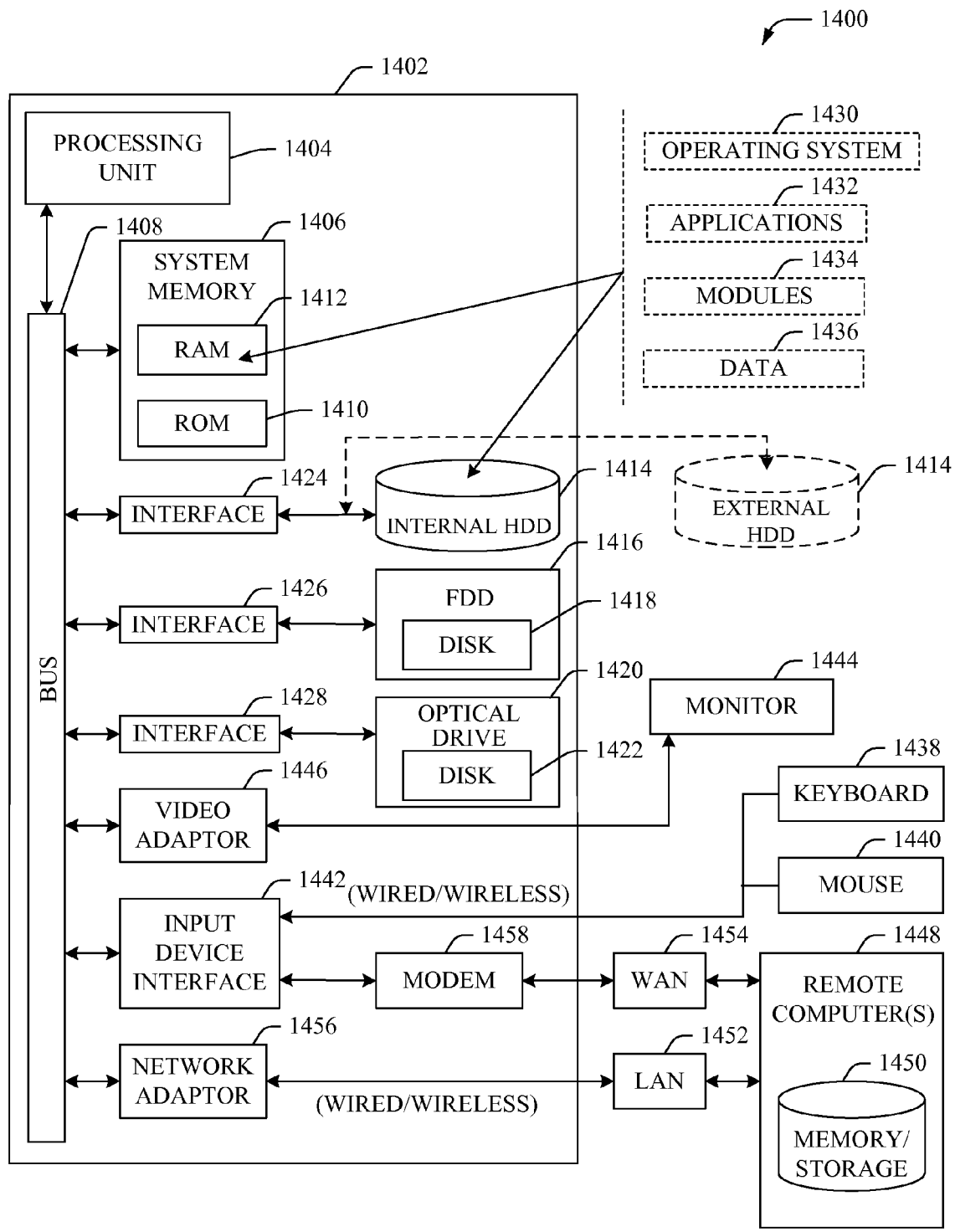
FIG. 14 illustrates a block diagram of a computer operable to execute the disclosed adaptive link diversity architecture.

Referring now to FIG. 14, there is illustrated a block diagram of a computer operable to execute the disclosed architecture. In order to provide additional context for various aspects of the subject specification, FIG. 14 and the following discussion are intended to provide a brief, general description of a suitable computing environment 1400 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 14, the example environment 1400 for implementing various aspects of the specification includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the specification can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) may include a micro-phone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adapter 1456 may facilitate wired or wireless communication to the LAN 1452, which may also include a wireless access point disposed thereon for communicating with the wireless adapter 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are example and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

It is to be noted that aspects, features, or advantages of the subject innovation described in the subject specification can be exploited in substantially any wireless communication technology. For instance, 4G, Enhanced GPRS, 3GPP LTE, 3GPP2UMB, 3GPP UMTS, HSPA, or Zigbee. Additionally, substantially all aspects of the subject innovation as disclosed in the subject specification can be exploited in legacy telecommunication technologies.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a memory to store executable instructions; and
    a processor, coupled to the memory, that facilitates execution of the executable instructions to perform operations, comprising:
        subsequent to a circuit-switched communication session being determined to be established between an access point device and a user equipment via a radio bearer link that is shared by user equipments coupled to the access point device, determining ratio data indicative of a ratio of a first number of data transmissions sent from the access point device to the user equipment, to a second number of data transmissions sent from the user equipment to the access point device during the circuit-switched communication session, and
        based on a determination that the ratio data satisfies a defined ratio criterion and retransmission data indicative of a rate at which information has been retransmitted between the user equipment and the access point device satisfies a defined retransmission criterion, reconfiguring the circuit-switched communication session between the access point device and the user equipment via a dedicated radio bearer link.

2. The system of claim 1, wherein the operations further comprise:
    determining the retransmission data based on monitoring retransmission of the information between the user equipment and the access point device.

3. The system of claim 1, wherein the operations further comprise:
    determining distance data indicative of a distance of the user equipment from the access point device, wherein the reconfiguring of the circuit-switched communication session is in response to the distance data being determined to satisfy a defined distance criterion.

4. The system of claim 1, wherein the defined retransmission criterion comprises retransmission information indicative of a threshold rate and the reconfiguring of the circuit-switched communication session is in response to determining that the rate is higher than the threshold rate.

5. The system of claim 1, wherein the operations further comprise:
directing communication data between the access point device and the user equipment via the radio bearer link; and
subsequent to the directing, redirecting the communication data between the access point device and the user equipment via the dedicated radio bearer link.

6. The system of claim 1, wherein the radio bearer link comprises a circuit switched over high speed packet access connection and the dedicated radio bearer link comprises a release 99 circuit switched connection.

7. The system of claim 1, wherein the operations further comprise:
facilitating a concurrent transmission of data associated with the circuit-switched communication session between the access point device and the user equipment via the shared radio bearer link and the dedicated radio bearer link.

8. The system of claim 7, wherein the operations further comprise:
receiving, from the user equipment, channel quality information representing a channel quality indicator, wherein the reconfiguring of the circuit-switched communication session is in response to the channel quality information being determined to satisfy a defined channel quality indicator criterion.

9. A method, comprising:
determining, by a system comprising a processor, retransmission data indicative of a rate of data retransmissions associated with a circuit-switched communication session between a user equipment and an access point device via a shared transport link; and
in response to determining that the retransmission data satisfies a retransmission criterion and determining that ratio data indicative of a ratio of a first number of data transmissions sent from the access point device to the user equipment, to a second number of data transmissions sent from the user equipment to the access point device during the circuit-switched communication session satisfies a ratio criterion, facilitating, by the system, a reconfiguration of the circuit-switched communication session between the access point device and the user equipment via a dedicated transport link.

10. The method of claim 9, wherein the determining that the retransmission data satisfies the retransmission criterion comprises determining that the rate is higher than a defined rate threshold.

11. The method of claim 9, wherein the facilitating the reconfiguration comprises facilitating the reconfiguration of a circuit switched over high speed packet access connection between the access point device and the user equipment to release 99 circuit switched connection.

12. The method of claim 9, wherein the facilitating the reconfiguration comprises:
based on channel quality information representing a channel quality indicator received from the user equipment, reconfiguring a circuit switched over high speed packet access connection between the access point device and the user equipment to release 99 circuit switched connection.

13. The method of claim 9, further comprising:
determining, by the system, distance data indicative of a distance of the user equipment from the access point device, wherein the facilitating the reconfiguration comprises facilitating the reconfiguration in response to determining that the distance data satisfies a defined distance criterion.

14. The method of claim 9, wherein the facilitating the reconfiguration comprises:
subsequent to a retransmission of first data of the circuit-switched communication session via the shared transport link, facilitating a transmission of the first data between the user equipment and the access point device via the dedicated transport link.

15. A non-transitory computer-readable storage device comprising executable instructions that, in response to execution, cause a system comprising a processor to perform operations, comprising:
determining retransmission data indicative of a rate of repetitions of data transmission between a user equipment and an access point device during a circuit-switched communication session that is facilitated via a shared transport link; and
in response to determining that the retransmission data satisfies a retransmission criterion and determining that ratio data indicative of a ratio of a first number of data transmissions sent from the access point device to the user equipment, to a second number of data transmissions sent from the user equipment to the access point device during the circuit-switched communication session, satisfies a ratio criterion, reconfiguring the circuit-switched communication session between the access point device and the user equipment via a dedicated transport link.

16. The non-transitory computer-readable storage device of claim 15, wherein the determining that the retransmission data satisfies the retransmission criterion comprises determining that the rate of repetitions is higher than a defined rate threshold.

17. The non-transitory computer-readable storage device of claim 15, wherein the reconfiguring further comprises reconfiguring the circuit-switched communication session in response to determining that a value associated with a radio condition associated with the user equipment is less than a threshold value.

18. The non-transitory computer-readable storage device of claim 15, wherein the shared transport link comprises a circuit switched over high speed packet access connection and the dedicated transport link comprises a release 99 circuit switched connection.

19. The non-transitory computer-readable storage device of claim 17, wherein the threshold value is a first threshold value and the operations further comprise:
comparing the value with a second threshold value, wherein the second threshold value is lower than the first threshold value.

20. The non-transitory computer-readable storage device of claim 19, wherein the operations further comprise:
facilitating a first transmission of first data associated with the circuit-switched communication session between the access point device and the user equipment via the dedicated transport link; and
in response to the determining that the value is less than the second threshold value, facilitating, concurrently with the first transmission, a second transmission of second data associated with the circuit-switched communication session between the user equipment and the access point device via the shared transport link.

21. A user equipment, comprising:

a memory to store executable instructions; and a processor, coupled to the memory, that facilitates execution of the executable instructions to perform operations, comprising:

receiving first data associated with a circuit-switched communication session from an access point device via a shared radio bearer link that is utilized for a communication session, and in response to receiving information associated with a change in the shared radio bearer link that is determined as a function of ratio data being determined to satisfy a defined ratio criterion and retransmission data being determined to satisfy a defined retransmission criterion, facilitating a reception of second data associated with the circuit-switched communication session from the access point device via a dedicated radio bearer link, wherein the ratio data is indicative of a ratio of a first number of data transmissions sent from the access point device to the user equipment, to a second number of data transmissions sent from the user equipment to the access point device and wherein the retransmission data is indicative of a rate at which communication data has been retransmitted between the user equipment and the access point device.

22. The user equipment of claim 21, wherein the operations further comprise:

receiving third data associated with the circuit-switched communication session from the access point device via the shared radio bearer link concurrently with the reception of the second data via the dedicated radio bearer link, and aligning the second data with the third data.

23. The user equipment of claim 21, wherein the operations further comprise:

directing, to the access point device, indicator data representing a channel quality indicator associated with the user equipment, wherein the information is determined as a function of the indicator data.

\* \* \* \* \*